(12) United States Patent
Colby

(10) Patent No.: US 9,696,877 B2
(45) Date of Patent: *Jul. 4, 2017

(54) CHARACTER-STRING COMPLETION

(71) Applicant: Michael K. Colby, Eagle, ID (US)

(72) Inventor: Michael K. Colby, Eagle, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 15/419,950

(22) Filed: Jan. 30, 2017

(65) Prior Publication Data

US 2017/0139559 A1    May 18, 2017

Related U.S. Application Data

(63) Continuation of application No. 13/761,068, filed on Feb. 6, 2013, now Pat. No. 9,557,890.

(60) Provisional application No. 61/595,606, filed on Feb. 6, 2012.

(51) Int. Cl.
| | |
|---|---|
| *G06F 3/0482* | (2013.01) |
| *G06F 17/27* | (2006.01) |
| *G06F 3/0488* | (2013.01) |
| *G06F 3/023* | (2006.01) |

(52) U.S. Cl.
CPC .......... *G06F 3/0482* (2013.01); *G06F 3/0236* (2013.01); *G06F 3/0237* (2013.01); *G06F 3/04886* (2013.01); *G06F 17/276* (2013.01)

(58) Field of Classification Search
CPC .... G06F 3/0482; G06F 3/0481; G06F 3/0426; G06F 3/0416; G06F 3/04886; G06F 3/0489; G06F 3/04892; G06F 3/04897; G06F 15/0225
See application file for complete search history.

(56) References Cited

U.S. PATENT DOCUMENTS

| | | | |
|---|---|---|---|
| 5,835,635 | A | 11/1998 | Nozaki et al. |
| 6,002,390 | A | 12/1999 | Masui |
| 6,094,197 | A | 7/2000 | Buxton et al. |
| 6,275,801 | B1 | 8/2001 | Novak et al. |
| 6,292,179 | B1 | 9/2001 | Lee |
| 6,501,464 | B1 | 12/2002 | Cobbley et al. |
| 7,818,691 | B2 | 10/2010 | Irvine |
| 8,619,048 | B2 | 12/2013 | Shimoni |
| 9,557,890 | B2 | 1/2017 | Colby |
| 2003/0193478 | A1 | 10/2003 | Ng et al. |
| 2003/0197687 | A1 | 10/2003 | Shetter |
| 2005/0057512 | A1 | 3/2005 | Du et al. |
| 2006/0095844 | A1 | 5/2006 | Van Leeuwen |

(Continued)

FOREIGN PATENT DOCUMENTS

| | | |
|---|---|---|
| JP | H1153117 | 2/1999 |
| RU | 2010111037 | 9/2011 |

(Continued)

OTHER PUBLICATIONS

"Extended European Search Report", EP Application No. 13747261.9, Oct. 22, 2015, 11 pages.

(Continued)

*Primary Examiner* — Scott Baderman
*Assistant Examiner* — Sookil Lee
(74) *Attorney, Agent, or Firm* — Michael Colby

(57) ABSTRACT

This disclosure describes techniques enabling character-string completion. These techniques present characters and character strings responsive to a selected prior character and enable selection of one of these characters or character strings quickly, easily, and/or accurately.

20 Claims, 7 Drawing Sheets

(56) References Cited

U.S. PATENT DOCUMENTS

| | | |
|---|---|---|
| 2006/0265668 A1 | 11/2006 | Rainisto |
| 2007/0046641 A1 | 3/2007 | Lim |
| 2007/0063984 A1 | 3/2007 | Chung |
| 2007/0096956 A1 | 5/2007 | Smith |
| 2008/0055269 A1 | 3/2008 | Lemay et al. |
| 2008/0259022 A1 | 10/2008 | Mansfield et al. |
| 2008/0316183 A1 | 12/2008 | Westerman et al. |
| 2008/0316212 A1 | 12/2008 | Kushler |
| 2009/0073136 A1 | 3/2009 | Choi |
| 2009/0213134 A1 | 8/2009 | Stephanick et al. |
| 2009/0225041 A1 | 9/2009 | Kida et al. |
| 2009/0313572 A1 | 12/2009 | Paek et al. |
| 2010/0225592 A1 | 9/2010 | Jo |
| 2010/0225599 A1 | 9/2010 | Danielsson et al. |
| 2011/0037718 A1 | 2/2011 | Stephanick et al. |
| 2011/0041096 A1 | 2/2011 | Larco et al. |
| 2011/0071834 A1 | 3/2011 | Kristensson et al. |
| 2011/0148787 A1 | 6/2011 | Kim |
| 2011/0258565 A1 | 10/2011 | Arscott et al. |
| 2011/0302518 A1 | 12/2011 | Zhang |
| 2012/0011466 A1 | 1/2012 | Miyamoto et al. |
| 2012/0223889 A1 | 9/2012 | Medlock et al. |
| 2012/0256840 A1 | 10/2012 | Razzaghi |
| 2013/0002553 A1 | 1/2013 | Colley |
| 2013/0069881 A1 | 3/2013 | Pasquero et al. |
| 2013/0086502 A1 | 4/2013 | Rysa |
| 2013/0120278 A1 | 5/2013 | Cantrell |
| 2013/0125034 A1 | 5/2013 | Griffin et al. |
| 2013/0205242 A1 | 8/2013 | Colby |
| 2014/0058725 A1 | 2/2014 | Longé et al. |
| 2014/0317547 A1 | 10/2014 | Bi et al. |
| 2014/0350920 A1 | 11/2014 | Medlock et al. |
| 2014/0359515 A1 | 12/2014 | Medlock et al. |

FOREIGN PATENT DOCUMENTS

| | | |
|---|---|---|
| WO | WO-2009034220 | 3/2009 |
| WO | WO-2011156162 | 12/2011 |
| WO | WO-2013119712 | 8/2013 |

OTHER PUBLICATIONS

"Final Office Action", U.S. Appl. No. 13/761,068, Oct. 23, 2015, 30 pages.

"International Search Report and Written Opinion", Application No. PCT/US2013/024993, Jun. 14, 2013, 7 pages.

"Non-Final Office Action", U.S. Appl. No. 13/761,068, Mar. 16, 2015, 24 pages.

"Non-Final Office Action", U.S. Appl. No. 13/761,068, Apr. 5, 2016, 33 pages.

"Notice of Allowance", U.S. Appl. No. 13/761,068, Sep. 23, 2016, 11 pages.

CHARACTER-STRING COMPLETION

RELATED APPLICATIONS

The present disclosure claims priority to U.S. Provisional Patent Application Ser. No. 61/595,606 filed Feb. 6, 2012 and to U.S. patent application Ser. No. 13/761,068 filed Feb. 6, 2013, the disclosure of which is incorporated by reference herein in its entirety.

SUMMARY

A method is described that presents, based on a selected character selected through a first portion of a single, continuous gesture, multiple character strings representing later parts of words or acronyms of which the selected character is a prior part, enables selection, through a second portion of the single, continuous gesture, to select one of the multiple character strings, receives selection of one of the multiple character strings through the second portion of the single, continuous gesture, and provides the selected one of the multiple character strings or the word or acronym of which the selected one of the multiple character strings represents later parts.

Another method is described that receives an indication indicating selection of a character, the selection of the character through a portion of a single, continuous gesture received through a gesture-sensitive character-entry interface, presents or causes presentation of, responsive to the selection of the character, based on the character, and prior to completion of the single, continuous gesture, multiple characters in a user interface superimposed adjacent a location at which the character was selected or over at least a portion of the gesture-sensitive character-entry interface, the multiple characters continuing a character string of which the character made through the gesture-sensitive character-entry interface is a prior part, enables selection, through a later portion of the single, continuous gesture, to select one of the multiple characters, receives selection of one of the multiple characters through the later portion of the single, continuous gesture, and provides or presents the selected one of the multiple characters.

Another method is described that presents a first user interface having, and enabling selection of, multiple characters or character strings through a gesture or gesture portion, the multiple characters or character strings presented at least partially obscuring an unselected character entry control of a second user interface and adjacent to or surrounding a selected character entry control of the second user interface, and responsive to selection of one of the multiple characters or character strings, provides the one of the multiple characters or character strings and ceasing to present at least a portion of the first user interface.

These methods are provided by way of example only; they are not intended to, and are not to be interpreted as limiting the scope of the claims.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

This disclosure describes techniques enabling character-string completion. These techniques present characters and character strings responsive to a selected prior character and enable selection of one of these characters or character strings quickly, easily, and/or accurately.

In some embodiments, the described techniques enable selection of a word and its correct spelling through a single, continuous gesture. Thus, a same gesture that selects the word may also select its proper spelling, even in advance of completing the word. Contrast this with various conventional techniques, some of which require many gestures to select a single word, which may or may not be properly spelled, or require selection of characters to make up a word and then require, with another gesture, selection of the correct spelling of the characters selected. Even in the best of cases, these conventional techniques often present few or even only one properly spelled word estimated to be the word intended by the selected characters. As will be apparent in the description below, the techniques, in some embodiments, are capable of solving these and/or other deficiencies present in current techniques.

In the discussion that follows, an operating environment in which the techniques may be performed is first described. Methods are then described that may be employed in the operating environment as well as other environments. In the discussion below, reference will be made to the environment by way of example only and, therefore, implementations described below are not limited to the described environment.

Example Operating Environment

Figure 1:
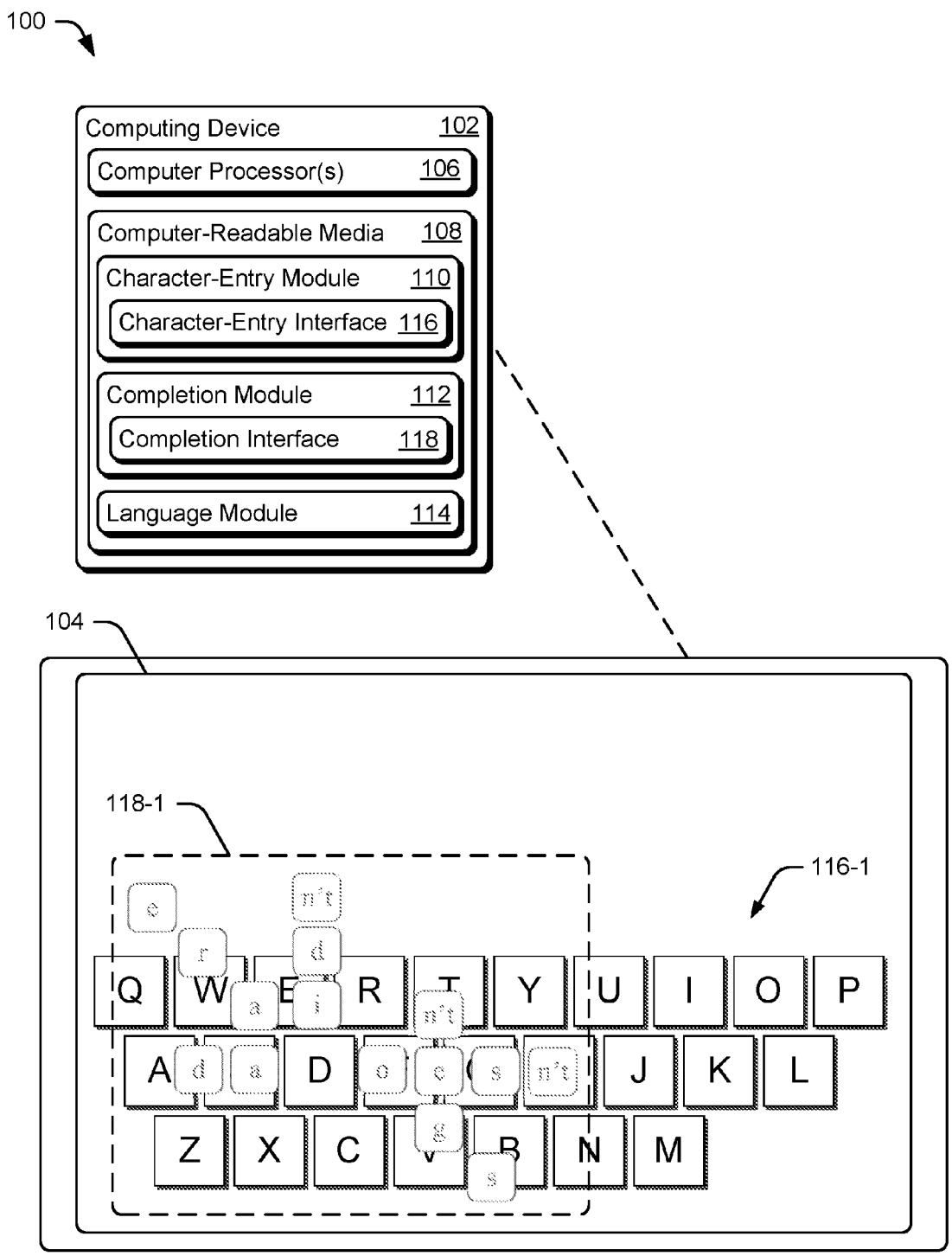
FIG. 1 illustrates an operating environment in which techniques enabling character-string completion can be performed.

FIG. 1 is an illustration of an example operating environment 100 in which the techniques enable character-string completion. Operating environment 100 includes a computing device 102 and a gesture-sensitive display 104. Computing device 102 and gesture-sensitive display 104 communicate with each other, though they may be separate, as in the case of some desktop computers, or integrated, as in the case of some handheld (e.g., smartphone), laptop, and tablet computers. Computing device 102 includes computer processor(s) 106 and computer-readable storage media 108, which includes a character-entry module 110, a character-string completion module 112, and language module 114.

Character-entry module 110 presents character-entry interface 116 and enables gesture-sensitive selection of characters through controls. An example of character-entry interface 116 is shown at 116-1 in FIG. 1 having controls that appear like keys of a keyboard and arranged in a QWERTY orientation, though other interfaces may instead be used. This QWERTY example of character-entry interface 116 presents keys and enables selection of characters through tap gestures or gesture portions on these keys as received through gesture-sensitive display 104.

Character-string completion module 112 (completion module 112) presents completion interface 118 and enables selection of characters and character strings using completion interface 118. An example of completion interface 118 is shown at 118-1 in FIG. 1 having selectable character strings presented responsive to selection of the letter "d" through example character-entry interface 116-1. Here example completion interface 118-1 presents character strings determined to be likely to complete a word or acronym starting with the letter "d". These character strings include "o", for the word "do", "og" for the word "dog", "ogs" for the word "dogs", "oe" for the word "doe", "oes" for the word "does", "oesn't" for the "doesn't", "ad" for the word "dad", "are" for the word "dare", "id" for the word "did", "idn't" for the word "didn't", and "on't" for the word "don't". Ways in which character strings are presented and selection enabled are set forth in greater detail below.

Language module 114 can be one or a combination of various different types of dictionary, word-completion, spelling, or text aggregation entities known in the art. Language module 114 provides character strings to completion module 112 based on a language being used (e.g., American English, European French) and/or a user's history. Language module 114 can provide character strings in various manners known in the art, such as to provide words, text strings and acronyms (e.g., LOL for "laugh out loud"), and/or their likelihood. Language module 114 may do so based on provided character(s), such as the example first letter "d" above and, based on the provided characters, provide character strings (e.g., words), their likelihood, and various other information usable by completion module 112. Language module 114 may instead provide character strings not based on provided characters, such as providing many words of a particular language. In these and some other cases, completion module 112 determines which character strings to present based on the character strings provided by language module 114, a selected character or characters, and/or various other factors described below.

Ways in which the modules and interfaces of example operating environment 100 act and interact are set forth in greater detail below. The entities of FIG. 1 are examples only, other entities, such as an operating system, may be involved and other arrangements, such as a single entity performing the actions of character-entry module 110 and completion module 112, may instead be used.

Methods for Character-String Completion

This disclosure describes techniques for character-string completion. These techniques enable quick, easy, and/or accurate completion of character strings. These techniques include various methods illustrated below, which may be used separately or in combination, in whole or in part. Aspects of these methods may be implemented in hardware, firmware, software, or a combination thereof. The methods are shown as a set of acts that specify operations performed by one or more entities and are not necessarily limited to the order shown.

Figure 2:
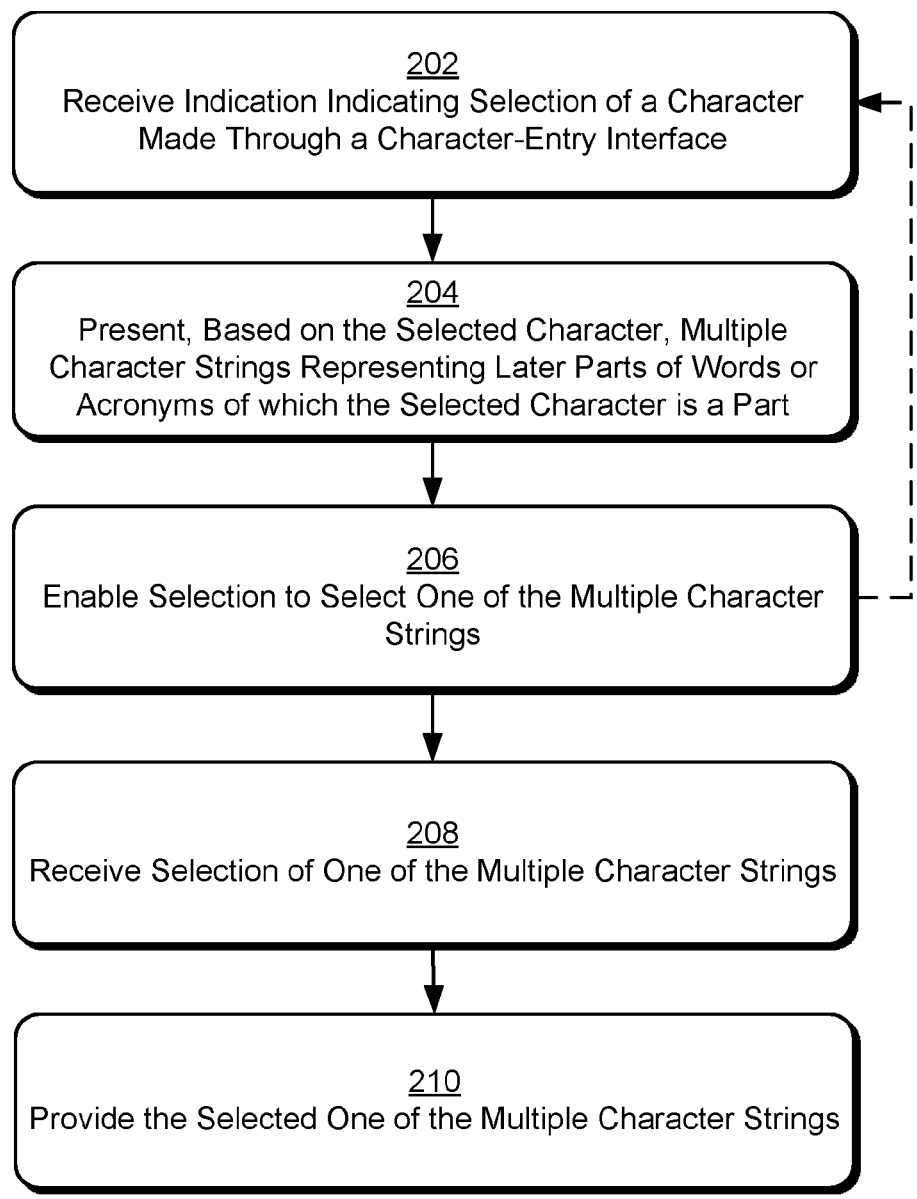
FIG. 2 illustrates methods for character-string completion.

FIG. 2 illustrates methods 200 for character-string completion. Methods 200 may be performed in various manners. In one manner of performing methods 200, a user is enabled to select, with as little as a single, continuous gesture, a correctly-spelled word or acronym. In another manner, a user is enabled to select a correctly-spelled word or acronym with multiple gestures located close to each other, thereby making selection relatively quick and easy. These and other manners of performing methods 200 are set forth below.

At 202, an indication indicating selection of a character made through a character-entry interface is received. This indication can be received internally, and thus a same entity may provide the indication and receive it or it may be received from a separate entity. This selection as indicated can be through a gesture-sensitive interface made through a portion of a single, continuous gesture, such as a tap-and-hold or touch-and-slide. The selection may instead be through other manners, such as a tap gesture, a swirl, or a two-finger gesture (at once or one after the other), to name a few. Whatever the gesture or gesture portion, an indication indicating selection of a character is received. The indication can be received (passively, or actively retrieved) from various entities, such as an operating system, gesture-input managing entity, gesture-sensitive display 104, character-entry module 110, or character-entry interface 116, to name just a few.

By way of example, consider again the example character-entry interface 116-1 of FIG. 1. Here assume that a user taps and holds, as a first portion of a gesture, to select the letter "d". In response, character-entry module 110 provides an indication to completion module 112 that the letter "d" has been selected and that the gesture portion that selected it is a tap and hold.

At 204, multiple character strings representing later parts of words or acronyms of which the selected character is a part are presented. These character strings may be presented responsive to some determination or indication that presentation of characters strings is desired, such as an affirmative selection or an implied or inferred selection, such as based on a tap-and-hold portion of a gesture being received rather than a tap alone, though other manners may also be used.

Consider a case where a user wishes to enter the word "do". With a small word the user may simply wish to use character-entry interface 116 to tap the "d" and the "o" without presentation of completion interface 118. In other cases, however, a user may wish to use completion interface 118 to select a character string, such as it being a long word or one that the user may not know how to spell. Consider a can where a user has forgotten how to spell the word "tongue". The user may select, with a quick tap, the "t" and then the "o" but a tap and hold on the "n". In response to the hold (here a preset time delay passing during which a gesture does not substantially move), the techniques may present multiple character strings, one of which is the properly spelled word "tongue", which the user may then select. This is but one of the ways the techniques enable users to efficiently use character-string completion, including when using two interfaces.

These character strings may also be presented without a determination or indication, in which case selection of a character string instead of other selections, such as through tapping to select keys of a keyboard, is differentiated based on the type of selection. This will be described in greater detail elsewhere herein.

The multiple character strings can be presented in various manners as well. Completion interface 118, for example, may be fully opaque, partially opaque, or nearly transparent. Using FIG. 1 as an example, the character strings "oesn't" may obscure the underlying keys "F", "G", and "H" or permit them to be seen, in part, through the character strings.

A fully opaque interface enables the characters strings to be easily seen and noticed. If the user, however, decides not to select one of the character strings, such as by lifting off his or her finger or stylus, completion module 112 may quickly cease to present the opaque interface thereby permitting the user to quickly see the underlying keys to continue to select characters through character-entry interface 116 (in the example 116-1, the "F", "G", and "H" keys).

A partially opaque interface permits both the character strings and the underlying character controls (e.g., the keys of 116-1 in FIG. 1) to be seen. This can aid a user in his or her speed to select characters through the character-entry interface 116 should the user decide not to select a character string.

A nearly transparent interface aids a user in cases where much of the character selection is through character-entry interface 116, and thus the user's preference is for that interface to be obscured very little. All three of these cases assume that the completion interface 118 overlays character-entry interface 116, though this is not required. Having the character strings near a selected character can improve the speed of selection of the character string, though it may instead occupy a different region of gesture-sensitive display 104.

Continuing the ongoing example, completion module 112 receives the indication from character-entry module 110 that the letter "d" is selected through a tap-and-hold portion of a gesture. Here completion module 112 determines that character strings are desired based on the tap-and-hold or that the gesture is being maintained. In response, completion module 112 determines character strings to present.

Completion module 112 may determine character strings to present using language module 114, such as to provide prior characters (here just "d") to language module 114, and receive back various words and acronyms that begin with "d". Completion module 112 may also receive likelihoods that each of these various words and acronyms are desired by a typical user in the applicable language or the particular user based in part on a user history of the user's prior character-string selections.

Here assume that language module 114 provides seventy words and acronyms along with their likelihoods. Completion module 112 determines, based on various factors, which characters strings to present. Completion module 112 may do so based on lengths of the strings, real estate available on gesture-sensitive display 104 to present the strings, a type of gesture-sensitive display (e.g., QWERTY keyboard, circular keyboard, fast-entry keyboard, multi-character-per-key limited-space keyboard common to some mobile phones), or string density. String density is a measure of the number of strings that can be presented within an amount of real estate. Thus, completion module 112 may determine to present the string representing the word "doe" even though it is less likely than the word "dreary" because "doe" is also part of two words that are more common than "dreary"; namely "does" and "doesn't". Further, completion module 112 may take into account this string density in the aggregate—thus, the multi-string of "do", "doe", "does", and "doesn't" is presented rather than the words "drip" and "drips" because, in the aggregate, the words of the first multi-string are more likely than those of the second multi-string.

As shown in the example of FIG. 1, completion module 112 presents, through example completion interface 118-1, character strings capable of completing twelve different words: do, dog, dogs, doe, does (the plural of "doe"), does (the verb), doesn't, dad, dare, did, didn't, and don't. As noted above, completion interface 118 can be nearly transparent, partially opaque, or fully opaque. In FIG. 1, each of the characters in the character strings is fully opaque, though spaces between the characters are transparent.

At 206, selection is enabled to select one of the multiple character strings. In some cases, this selection is enabled through a later portion of a single, continuous gesture, a prior portion of which selected the selected character. Note that the selection can be enabled through multiple gestures or a single continuous gesture. The gesture or gestures can be a substantially straight line or otherwise, such as a gesture starting at "d" and moving through characters "a", "r", and "e" to select character string "are" effective to complete the word "dare" or a curved gesture moving through characters "o" and "n't" to select character string "on't" to complete the word "don't". Note also that completion interface 118 may permit selection of a character string without the gesture passing through all of the characters of the string. In some cases, a swipe or other gesture or gesture portion selects the longest form of the character strings, such as "oesn't" or "idn't" rather than "does" or "did". This can be enabled through determining that the end of the gesture had a velocity or speed rather than a slow stop. This can also be determined based not on an end point of the gesture (e.g., based on the location of lift off), but instead based on inertia or speed of the gesture. If an end point that is determined based on a speed or inertia is at or past the last character in the string, the longest form of the characters strings can be determined to be selected. Determining an end point of a gesture based on a speed or inertia can be performed in various manners known in the art.

Similarly, the techniques may indicate that one of the character strings is a default character string. This default character string can be associated with a particular identifiable gesture portion by which to quickly select the default, such as a spiral, circular shape, zigzag, quick swirl, or swipe away from other presented character strings, to name just a few ways in which to enable selection. This gesture portion may be an ending portion of a current gesture (such as a current tap and hold) or another gesture.

Continuing the ongoing example, note that the character strings are presented, and selection of them is enabled, while the tap-and-hold gesture is being maintained. Thus, the user, instead of a tap and lift, taps and holds his or her finger or stylus on the letter "d". In response, the character strings are presented and selection of them is enabled.

Responsive to presentation, an indication of a selection other than of a presented character string may be received. In such a case the techniques may cease to present the character strings and return to block 202, shown with a dashed-line arrow in methods 200. Thus, continuing the ongoing example, in the case of a tap-and-hold of a selected character at block 202, completion module 112 ceases to present the character strings if the gesture ends through a lift off at the letter "d". At this point in the ongoing example, the user chose not to select one of the character strings. The user may have wanted the word "doughnut", and on not seeing it presented, ends the gesture by lifting up his or her finger or stylus. If, however, an indication of selection other than of a presented character string is not received, the methods proceed to block 208.

At 208, a selection of one of the multiple character strings is received. As noted, this selection can be received in various manners. By way of example, assume that the user selects the selected character string by continuing the single, continuous gesture noted above with a second portion. Thus, a tap-and-hold is received on the letter "d", and while the gesture is maintained, the character strings are presented and enabled, and then the user selects, with the same gesture, to swipe from the location of the "d" to an end point at the end of one of the character strings. In so doing, with a single gesture a user may select the "d" and then the full word or acronym (here correctly spelled), by continuing the gesture. Here a tap-and-hold first portion of the gesture and then a swipe movement to the "s" of the "oesn't" string, and then a lift off to end the gesture at the "s", results in the word "does" being selected quickly, easily, accurately, and with a single, continuous gesture.

At 210, the selected one of the multiple character strings is provided, such as to a data-entry field, control, or some entity capable of using character strings. Concluding the ongoing example, assume that a user is writing an email to send through his or her tablet computing device having the QWERTY keyboard of FIG. 1. The user selects, with a single, continuous gesture beginning on the QWERTY keyboard, the word "does" to be received by the email application, such as to be entered into the subject line or body of the email. After the selection of the character string, methods 200 cease to present character strings and may then wait to receive another indication at block 202. In some cases, methods 200 may insert a grammatical character automatically, such as a space after the word "does". Other grammatical characters, such as commas, periods, and those appropriate to the word or language within or after the word (e.g., "café" instead of "cafe" or an umlaut diacritic in the German language), may be inserted.

As noted above, various different character-entry and completion interfaces may be used by the techniques. The following provides additional examples and embodiments, which may be used alone or in conjunction with each of the various methods described herein.

Figure 3:
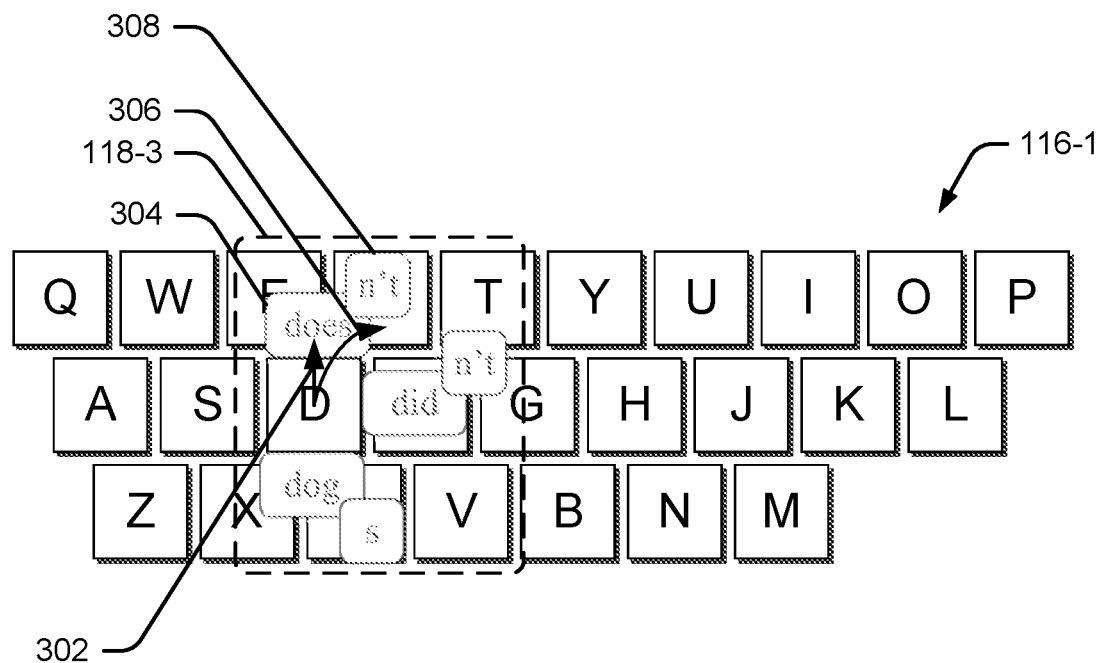
FIG. 3 illustrates an example completion interface presenting, and enabling selection of, complete words and their variants.

In one embodiment, completion module 112 presents example completion interface 118-3 of FIG. 3. Example completion interface 118-3 presents complete words or acronyms for selection. Selection is enabled with a short, simple gesture. A user, for example, may select the word "does," "did", or "dog" with a small, simple move from the selected prior character (here "d"), such as with a substantially linear, simple gesture 302 that selects the "d" and moves onto or even just toward but not onto the "does" control 304. Or a user may select these controls with a separate gesture that takes little effort, such as a simple tap on any of these controls.

Note that users are often inaccurate in selecting a control, such as the soft key to select the "d" in FIG. 3. This inaccuracy can be due to small controls, large hands, age, or a physical limitation, such as near blindness or Parkinson's disease. The techniques permit, however, as little as one accurate selection. Thus, with but one accurate selection of the "d" in FIG. 3, other selections may be less accurate or relatively imprecise. In some other manners, a user may have to accurately select the "d" and then an "o" and then an "e" and then an "s" to select a character string of "does." The techniques, in some embodiments however, enable selection of this character string with one accurate selection and one fairly imprecise or simple gesture rather than four accurate selections. Thus, not only is this four-character string selected more easily due to reducing the number of selections made from four to two, but also the accuracy needed for the second selection.

In another embodiment, completion module 112 enables selection, through completion interface 118-3, to select complete words, word forms of a base word, and/or likely alternatives to those words, such as plurals, verb, adverb, and noun forms of a word, and contractions. The example in FIG. 3 illustrates a contraction of the base word "does" with a second word "not" shown with "doesn't", which completion interface 118-3 enables a simple gesture or gesture portion to select. Thus, a user is enabled to select the word "does" with a simple move from "d" toward or onto "does" control 304, but with a slight change to that simple move instead select the alternative, here "doesn't". This slight change can be of many types, such as a different ending, e.g., a turn toward the "n't" control after first moving onto or toward the "does" control. In this example, a simple, curving gesture 306 from the "d" moving toward the "does" control and then arcing toward the "n't" control 308 selects the word "doesn't". Completion interface 118-3 may also enable selection of word forms and alternatives with a simple tap or another gesture as well, such as a tap on "does" control 304 and then another on "n't" control 308 or simply one tap on "n't" control 308 to select "doesn't".

Note that in this case and various others set forth herein, the techniques enable a user to select, with as little as one gesture, which is often a simple and easy gesture to perform, a complete and correctly spelled word or acronym. Contrast this with a case where a user types a word and then conventional techniques determine that the word is incorrectly spelled or an uncommon word and then either automatically replaces the word as typed or presents an alternative. This conventional technique can be slow, confusing, visually or manually difficult for users to handle, or inadequate.

The techniques may also or instead enable selection of character strings in multiple stages. As noted above, a user may select a complete character string in a simple, continuous gesture, the character string fully presented in the user interface. The techniques may also or instead enable selection in stages, such as with presentation of multiple interfaces.

Figure 4:
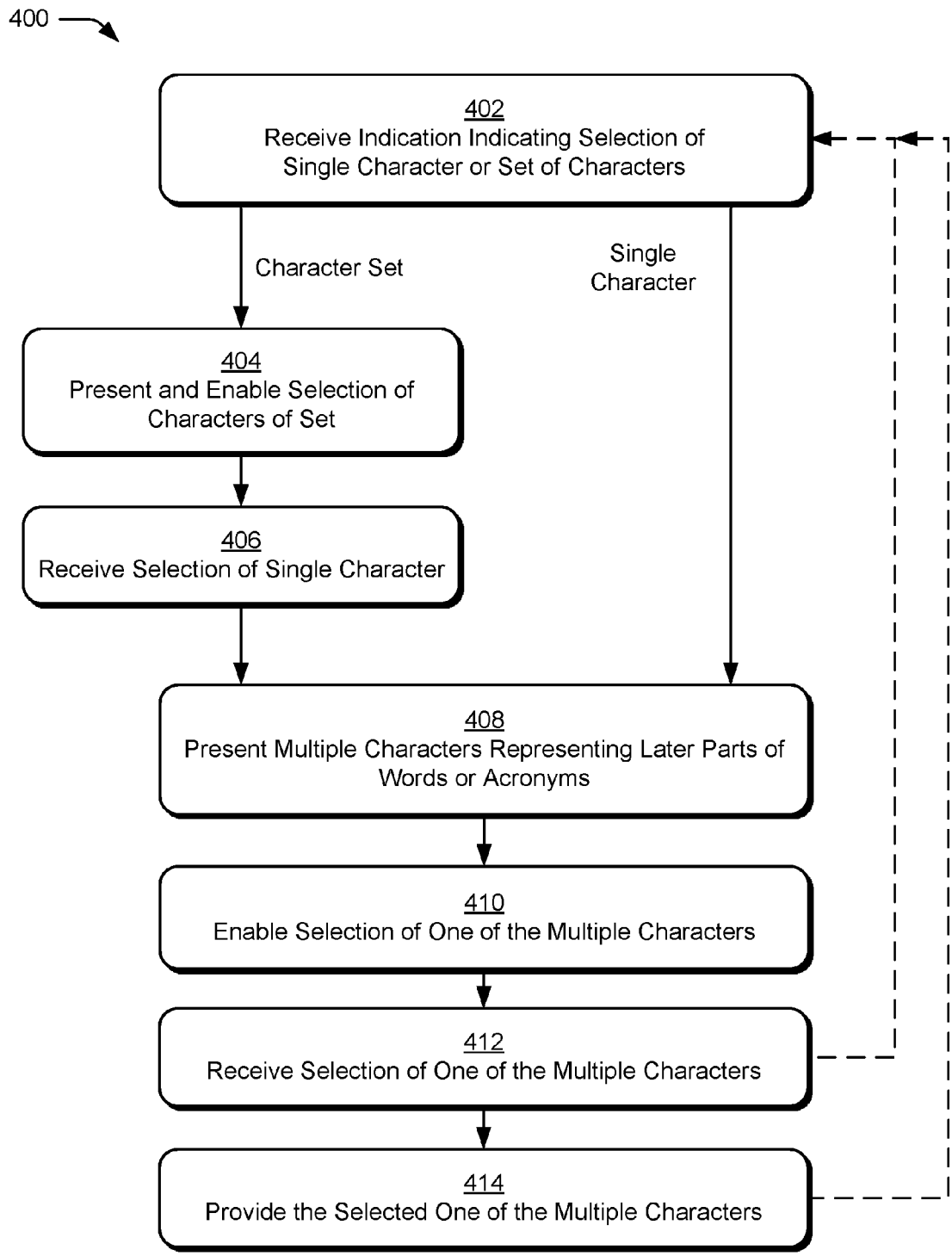
FIG. 4 illustrates methods for character-string completion, including through multiple stages, each stage based on a selection of a prior stage.

FIG. 4 illustrates methods 400 for character-string completion. Methods 400 may be performed in various manners, either alone or in conjunction with, in whole or in part, methods 200. In one manner of performing methods 400, a user is enabled to select a correctly-spelled word or acronym from many possible options through multiple stages, each stage can be based on a selection of a prior stage.

At 402, an indication indicating selection of a single character or a set of possible characters is received. This indication can be received internally, and thus a same entity may provide the indication and receive it or it may be received from a separate entity. The indication can also be received from a first application associated with a gesture-sensitive character-entry interface through which selection of the character is made and at a second application.

In cases where a set of possible characters has been selected, methods 400 proceed along a "character set" path to block 404. A set of characters is selected, for example, in cases where a control is selected that is associated with more than one character or where an inadequately precise selection is received that possibly indicates selection of one of two or more characters. At 404, presentation and selection of the characters of the set are enabled. Selection may be enabled similar to selection of character strings as in methods 200 above, thereby reducing the selection to a single character.

Figure 5:
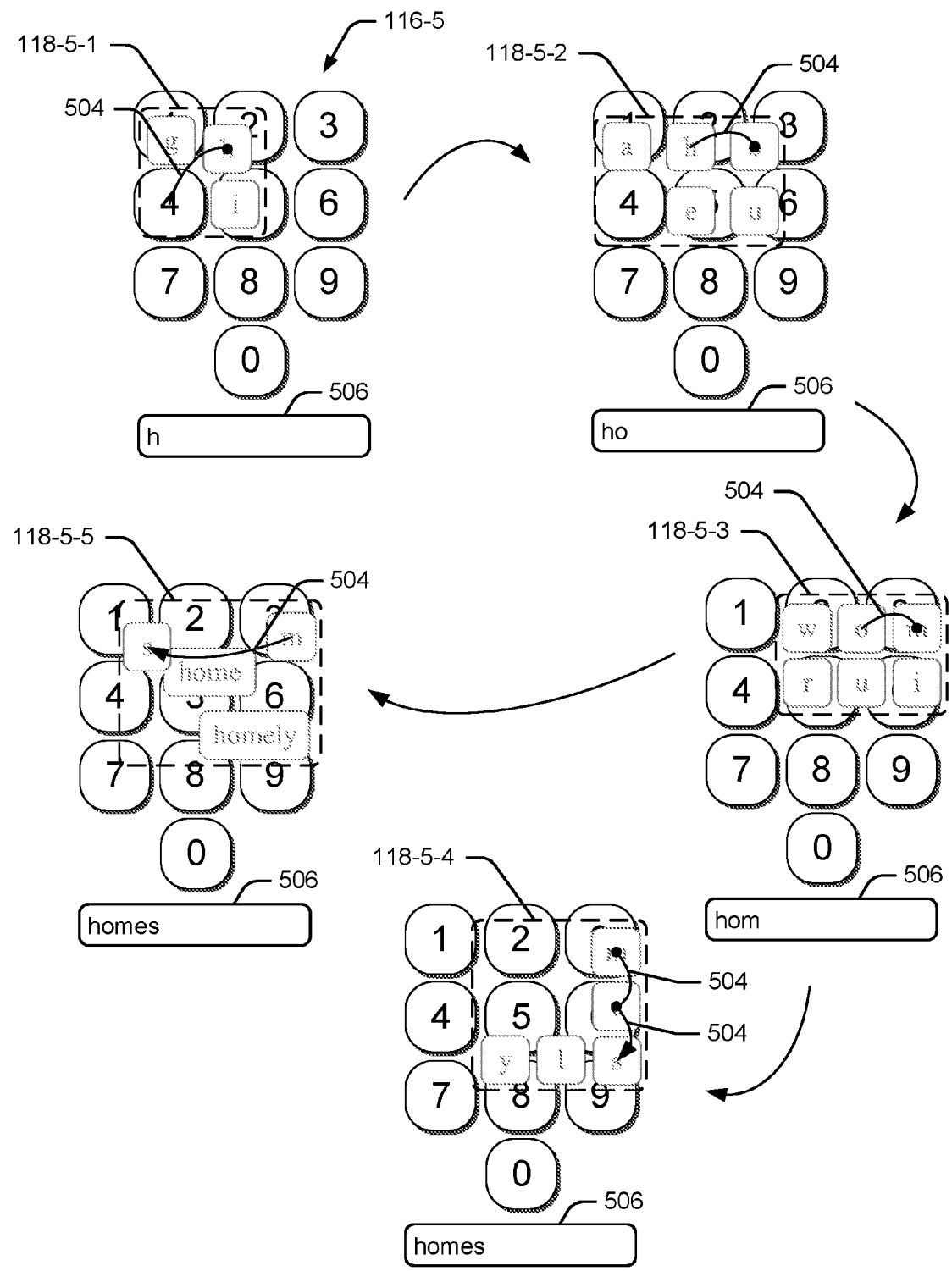
FIG. 5 illustrates a limited-space character-entry interface and multiple completion interfaces enabling selection of characters in stages.

By way of example, consider FIG. 5, which illustrates character-entry interface 116-5, which is a limited-space interface having controls associated each with a set of characters. Consider key 502, marked "4", selection of which indicates that one of the following characters is intended: 4, g, h, i. In response to selection of key 502, at 404 completion module 112 enables selection of one of these characters through a first stage of example completion interface 118-5-1, the "-1" indicating the first stage. At 406, selection of a single character of the set of characters is received. Here assume that a single, continuous gesture 504 selects key 502 and then moves to selected single character "h".

In cases where a selection of a single character is received at 402, methods 400 may act similarly at 402 as methods 200 at 202, though this is not required, and proceed along a single-character path to block 408. In either case, methods 400 proceed to block 408 once a character has been selected.

At 408, multiple characters are presented or caused to be presented, the multiple characters representing later parts of words or acronyms of which the selected character is potentially a part. These multiple characters can be presented responsive to various gestures or gesture portions, as noted herein. This presentation can be responsive to the selection and prior to completion of a single, continuous gesture. Also, the multiple characters can be presented in various interfaces as noted herein, such as a partially opaque user interface superimposed adjacent a location at which the selected character was input or over at least a portion of the gesture-sensitive character-entry interface. The multiple characters continue character strings of which the character made through the gesture-sensitive character-entry interface is potentially a prior part.

Continuing the ongoing example, the letter "h" is selected from the set of "4, g, h, i". Presentation and selection of characters of the set are an example first stage of multiple stages. At 408, completion module 112 presents, in a second stage of completion interface 118, marked as 118-5-2, four characters for selection. These four can be determined based on potential words or acronyms, for example, that begin with "h" and their likelihood as noted above. Thus, the multiple characters of completion interface 118-5-2 include "a" for the words "hair, hairs, hat, hats, had, have, haven't, ham, hams, hack, hacks, habit, habits, habitual" and so on, "e" for the words "he, her, hers', heal, heals, healed, health, healthy" and so on, "u" for the words "hum, humming, hums, hummed, hurt, hurts, hurting, human, humane, HUD (acronym for housing and urban development)" and so on, and the letter "o" for the words "home, homes, house, houses, hose, hosed, hoses, hoarse, hour, hours, homely" and so on.

At 410, selection of one of the multiple characters is enabled. As noted, selection may be enabled through a later portion of a single, continuous gesture. In the ongoing embodiment, a single continuous gesture selects a first character set, one of multiple presented characters, and further characters in progressive stages, ending with selection of a character string with one gesture. Note, however, that the techniques may enable selection with multiple gestures or other selection manners.

Continuing the ongoing embodiment, selection of letters "a", "o", "e", and "u" are enabled.

At 412, selection of one of the multiple characters of is received. Here it is received through a later portion of the same gesture 504 that selected the "4", then the "h", and now the "o".

At 414, the selected one of the multiple characters is provided or presented. Completion module 112 may provide or present characters in various manners, such as when each is selected or wait until the character string in full has been selected to provide or present them. In some cases, the techniques provide or present the selected character string after receiving an indication that a single, continuous gesture is complete, the gesture having selected a characters string. The selected character can be provided to various entities, including character-entry module 110 and/or character-entry interface 116, or some other application or entity, or presented, such as by completion interface 118.

In the ongoing embodiment, selection of "o" is made after selection of "h", and the selected characters are shown in a character presentation field 506. As noted above, characters may be presented or provided in various ways, such as to other entities, e.g., an email application, which may then present the selected characters and character strings in a subject or body of an email, for example, or a word processing application may receive the characters from completion module 112, for example. Here, in part due to the small amount of screen real estate available, characters are presented as selected and in a data presentation field.

As noted, the techniques may act to repeat portions of the methods, such as blocks 402, 408, 410, 412, and 414 of methods 400, as shown in the ongoing example. After receiving selection of "h" and "o", completion module 112 determines (e.g., by providing "ho" to language module 114 and receiving back character strings that begin with "ho"), other multiple characters to continue potential character strings. Here completion module 112 causes completion interface 118 to present and enable selection, shown at 118-5-3, of "w" (for the words "how", "howdy", "Howard", etc.), "r" (for the words "horse", "horn", "horrible", etc.), "u" (for the words "house", "hour", etc.), "i" (for the words "hoison", "hoist", and etc.), and "m" (for the words "home", "homes", "homely", "homily", "homogenize", and etc.).

Responsive to selection, with another portion of the single, continuous gesture 504 shown at 118-5-3, completion module 112 presents the selected letter "m" in character presentation field 506 (for a total of "hom"), and then presents and enables selection of still additional multiple characters, shown at 118-5-4. Methods 400 may continue to present characters for selection until receiving an indication that the character string is complete (e.g., responsive to a user ending a single, continuous gesture with a lift off). Methods 400, however, may at some point present characters to complete the characters string, such as in cases where the potential character strings available is low or relatively low based on likelihoods of characters strings being used. This is shown in two different example manners, both of which complete the selected character string at the word "homes."

In both cases, assume that completion module 112 determines that the likely character strings desired, when the prior characters selected are "hom" are "home", "homes", and "homely". At this point, completion module 112 can present and enable selection of the letters "e" and, for less likely character strings, "o" (for the words "homogenous", "homogenize", and "homogeneous", etc.), though in this example completion module 112 presents the three most-likely words. This determination can be based on likelihood but also screen real estate, word length, and other factors as noted herein.

In the first example case, completion module 112 causes completion interface 118 to present and enable, as shown at 118-5-4, selection of three different words. Selection, here through the gesture, to the "e" and ending the gesture results in "home", through the "e" to the "s" and end results in "homes", and through the "e", then the "1", and then ending at the "y" results in "homely". As shown in character presentation field 506, selection of "e" and then "s" at 118-5-4, completion module 112 presents the complete and correctly spelled word "homes".

In the second example case, a later portion of the single, continuous gesture selects to complete a word string having multiple remaining characters. Thus, completion module 112 causes completion interface 118 to present and enable, as shown at 118-5-5, selection of three different words having multiple characters remaining. Selection here can be fast and simple, as shown by moving to and stopping on a presented complete character string "home" and "homely" or a variant "homes".

Methods 400 perform blocks of the method repeatedly, effective to build a character string in successive stages. Each of the successive stages can be based on prior selected characters, thereby narrowing the possible character strings progressively. Thus, methods 400 present selectable characters selection of which continues a character string, here the selectable characters determined based on one or more existing characters of the character string. Also herein, the selectable characters are presented graphically proximate a last-selected existing character of the one or more existing characters that is displayed on the graphical user interface, as shown in FIG. 5.

Also in FIG. 5, even though the amount of real estate for presenting selectable characters is limited, the techniques permit a user to select, with a single, continuous gesture, many of the possible words and acronyms known for the particular language.

Note also that a user may maintain control over a small computing device, such as a person holding a smart phone have character-entry interface 116-5. A person's right thumb, in the example case, may start at control 502 and then, through movement of his or her right thumb, select a character string that can be long. Through this example case, a person was able to select a characters string without lifting his or her thumb off of the device, and thus lose the stability often provided by the thumb in conjunction with the palm and fingers holding the device. Further still, the resulting character string is correctly spelled within the same selection. Contrast this with some selection manners, such as one that requires three taps to select the "h" through control 502, then one or multiple taps to select each of the next four characters ("o", "m", "e", and "s"). In some selection interfaces even a five-letter character string can take ten to fifteen taps, each of which includes a possibility of error. The possibility of error can also be high, especially in cases where a person is holding a small device with a same hand that is selecting characters.

In some embodiments, as noted in part above, selection of more than one character is made either before completion module 112 presents characters or selection of a presented character is received. Thus, in methods 200 or 400 or a combination of parts of them, completion module 112 may present selectable characters or character strings and the user may not select one of the presented characters or strings. In such a case, the user may instead select, through the character-entry interface 116, another character while not making a selection through completion interface 118. Consider a case where a user selects the character "u". In response, assume completion module 112 presents character strings "umbrella" and its variant "umbrellas" and another word "under". Assume that the user wants instead to enter "undulation". Thus, the user ignores, instead selecting tap-by-tap, for example, an "n". In response assume that completion module 112 presents "under", "underwear", and "underneath". Again, the user does not select these, instead tapping on a character in character-entry interface 116 for the letter "d" and then "u". After these four characters are selected, namely "undu", completion interface presents two likely characters strings beginning with "undu", namely: "unduly" and "undulate", along with variants "undulates" and "undulation". At this point assume that the user selects "undulation" by continuing a gesture selecting the second "u" of "undu" or through another gesture or selection manner. Even though, in this example, a user still made four separate selections, the user was able to select six additional characters to complete the "undulation" character string with a single selection and correctly spelled.

As mentioned in part above, the techniques may use various user interfaces to enable completion of character strings, either separately or in conjunction, in whole or in part, with methods 200 and/or 400.

Figure 6:
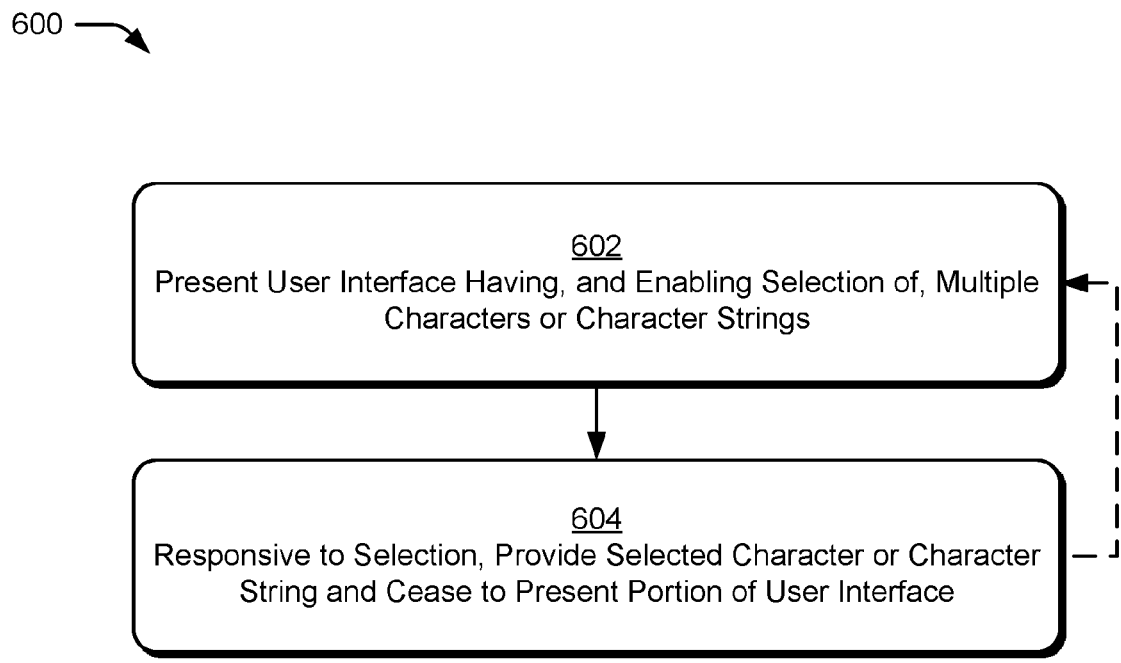
FIG. 6 illustrates methods for user interfaces enabling character-string completion.

FIG. 6 illustrates methods 600 enabling user interfaces for character-string completion.

At 602, a user interface is presented having, and selection is enabled of, multiple characters or character strings. The user interface enables selection of these characters and characters strings through a gesture or gesture portion. The user interface can be presented with the multiple characters or character strings partially obscuring an underlying other user interface, such as to partially obscure an unselected character entry control of the other user interface. The user interface may be arranged such that the characters or character strings are adjacent to or surrounding a prior-selected character, whether through a selected character entry control of the underlying user interface or a prior iteration of the user interface. Examples of these user interfaces are shown in FIGS. 1, 3, and 5.

In FIG. 5, for example, various completion interfaces 118-5 enable selection of characters through stages, each stage having another of the completion interfaces. Note that in these non-limiting cases, the techniques cease to present multiple characters of a prior iteration of the interface, other than the selected one of the multiple characters. Further, each successive user interface presents additional characters or character strings at least partially obscuring character entry controls of the underlying user interface and adjacent to or surrounding the selected one of the multiple characters of the prior iteration.

In some cases, these successive user interfaces are presented having selectable characters in such a manner as to enable selection without the gesture being jerky or having to substantially change direction with each portion. This can aid in stability when handling the gesture-sensitive device and/or improve selection accuracy.

Figure 7:
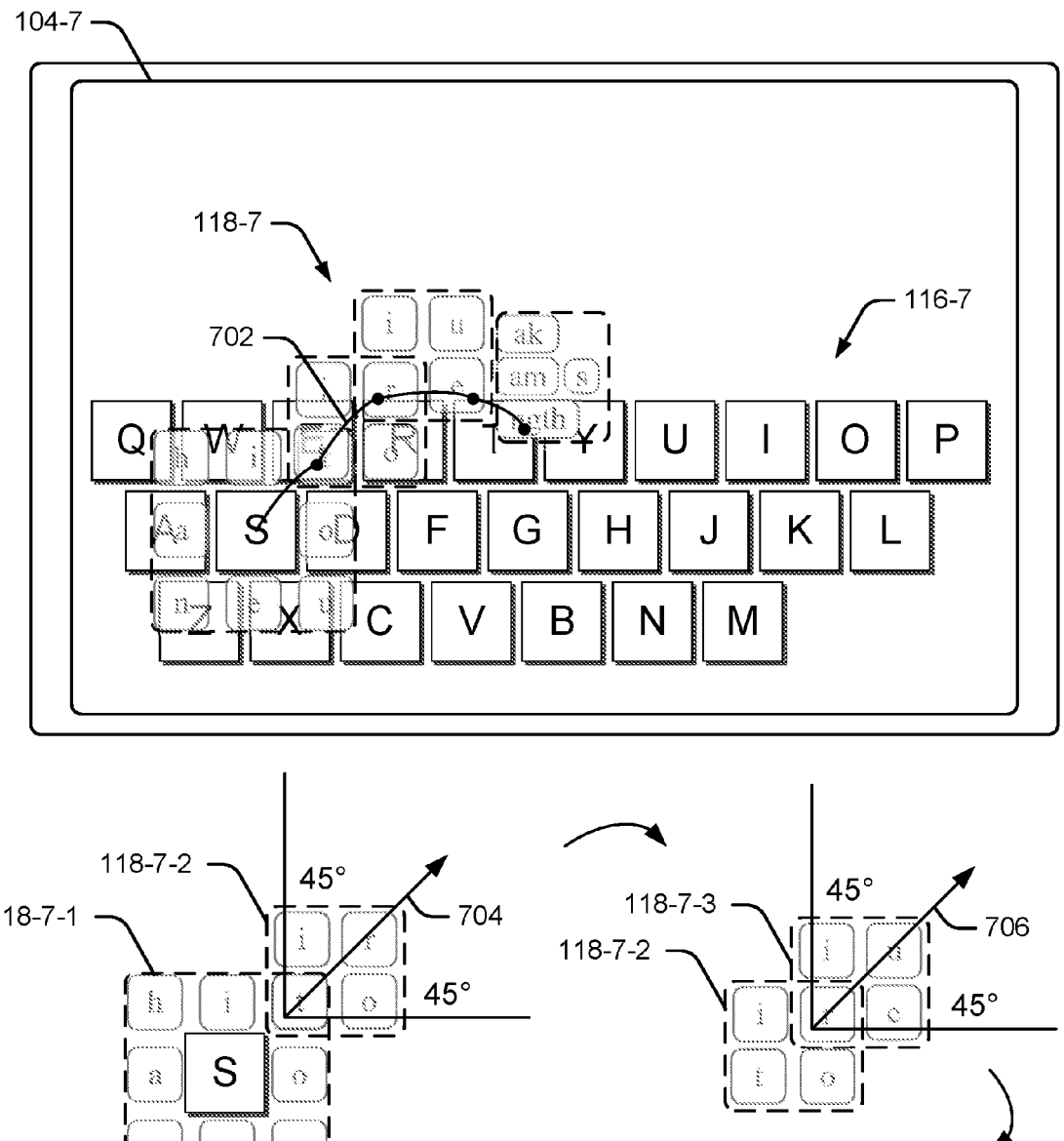
FIG. 7 illustrates four completion interfaces partially obscuring portions of an example character-entry interface.

Consider, for example, FIG. 7, which illustrates four completion interfaces 118-7 shown together in an example of gesture sensitive display 104 (shown at 104-7) and partially obscuring portions of example character-entry interface 116-7 (a QWERTY interface). Each of completion interfaces 118-7, after the initial interface, are presented in succession and enable selection at an angle with about a forty-five degree or less for a next selection. Smaller or larger angles may be used, such as substantially linear gestures deviating at each portion of about twenty degrees, ten degrees, or even fewer degrees. The interfaces are shown together, along with a single, continuous gesture 702 that selects a complete character string of "strength", though unselected characters of the interface can cease to be presented for visual clarity. Note that single, continuous gesture 702 does not include hard angles, back-and-forth motions, or complex movements. The techniques enable this and similar gestures having smooth movements, which may enable faster, easier, or more-accurate selection of character strings, though other gestures may also or instead be enabled.

Consider initial completion interface 118-7-1 (shown separate from character entry interface 116-7 for visual clarity), which enables selection of nine selectable characters in a square disk surrounding the selected character ("s"). Here assume that a gesture selects the character "s" through character-entry interface 116-7 and that initial completion interface 118-7-1 enables selection of one of the nine selectable characters with a second portion of that same gesture.

Returning to methods 600, at 604, responsive to selection of one of the multiple characters or character strings, the one of the multiple characters or character strings is provided and at least a portion of the first user interface ceases to be presented. In cases where a character string is selected, completion interface 112 provides the character string as noted elsewhere herein and ceases to present the user interface (thereby ceasing to obscure the underlying interface). In some cases, however, a character is selected rather than a complete string. In such a case, methods 600 return to block 602 (shown at dashed line path), where another interface is provided to enable further completion of a character string.

Completion module 112 can enable these interfaces based on an angle from a prior character's location on screen to a subsequently chosen character's location on screen, or may instead base it on the gesture portion that made the selection, which may deviate somewhat from the locations on screen. Thus, a gesture moving from a lower-right corner of a selectable control to an upper-left corner on a second selectable control residing directly to the right and adjacent the first selectable control may be assumed to be a gesture having zero degrees. Alternatively, the same gesture may be calculated as having an angle of about 20 degrees relative to horizontal. In either case, the techniques may present the next iteration of the completion interface having characters or character strings being within about forty-five degrees, thereby enabling a smooth gesture portion to select the next character.

Consider again FIG. 7, which shows second, third, and fourth completion interfaces 118-7-2, 118-7-3, and 118-7-4, respectively. In this example embodiment, successive completion interfaces enable selection of characters or character strings with a gesture or gesture portion within about forty-five degrees of the prior gesture or gesture portion's direction. Here the prior gesture portion that selected the "t" of initial completion interface 118-7-1 is approximated with gesture direction 704. Based on this line, characters presented by second completion interface 118-7-2 are within forty-five degrees of gesture direction 704. Likewise, the prior gesture portion that selected the "r" of second completion interface 118-7-2 is approximated with gesture direction 706 and, based on this line, characters presented by third completion interface 118-7-3 within forty-five degrees of gesture direction 706. Lastly, the prior gesture portion that selected the "e" of third completion interface 118-7-3 is approximated with gesture direction 708 and, based on this line, characters presented by fourth completion interface 118-7-4 within forty-five degrees of gesture direction 708.

These completion interfaces 118-7 are presented partially opaque, thereby permitting characters of the underlying interface (116-7) to remain at least partially visible. A user may select, instead of continuing to use one of completion interfaces 118-7, to return to using character-entry interface 116-7, such as by lifting off his or her stylus or finger. A user may then quickly select a character through the underlying interface without having to hunt for the character controls of the underlying interface or wait for a completion interface to cease to be presented. Thus, a user may select a control from an interface (e.g., character-entry interface 116-7) obscured by one of completion interfaces 118-7, the selection determined to be to the underlying interface based on the type of gesture or based on completion of the prior gesture.

These completion interfaces 118-7 are presented adjacent to a prior selected character's location, though this is not required. In some cases a user may select a character through character-entry interface 116 and indicate a desire to complete the character string using one or more completion interfaces 118, such as with a hold, circular movement, or other gesture or gesture portion. Instead of presenting an interface adjacent the selected character's location, the techniques may instead present a completion interface elsewhere, such as a middle of gesture-sensitive display 104, which may be affirmatively selected through a gesture or gesture portion at this location. By so doing the techniques may enable additional real estate in which to present character strings or successive completion interfaces. The techniques may also or instead present a completion interface in a region not occupied by character-entry interface 116. By so doing the techniques enable users to visually bifurcate use of completion interface(s) or continue to use a character-entry interface. The techniques may do so at any point in the various methods—thus, a user may select multiple characters and, at a point where completion interface 112 determines that complete characters strings are likely (e.g., that after receiving "stre" in FIG. 7), that complete words or acronyms should be presented. If the amount of real estate adjacent the last-selected character is limited, for example, or the number of complete characters strings takes up too much space near the last-selected characters location, completion module 112 may cause completion interface 118 to present the selectable character strings at a different location on gesture-sensitive display 104.

Note that one or more of the entities shown in FIG. 1, such as character-entry module 110, character-entry interface 116, completion module 112, and completion interface 118 may be further divided, combined, and so on. Each of these entities can be hardware, software, firmware, or a combination thereof, and/or stored on computer-readable storage media (as shown) and executed by one or more processors. This computer-readable storage media may include, by way of example and not limitation, memory devices with persistent and/or nan-transitory data storage, RAM, ROM, flash, and disk storage devices (e.g., magnetic and optical hard disk drives or compact disc or digital versatile disk (DVD)). Computing device 102 can be one or a combination of a wired and/or a wireless device, including those noted above as well as an appliance (e.g., a "smart" refrigerator), a peripheral, a gaming device, a server device, a television (e.g., a set-top box or a digital video recorder), and similar computing devices. Computing device 102 may include various managing entities and/or an operating system.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A system comprising:
   one or more processors; and
   memory having one or more instructions stored thereon
      that, responsive to execution by the one or more processors, causes the one or more processors to perform operations comprising:

presenting, based on a selected character and in a user interface, multiple character strings representing words or later parts of words or acronyms of which the selected character is a part, at least one of the multiple character strings being a multi-string having two or more character strings of the multiple character strings, the multi-string having or completing a long word and at least one of the two or more character strings having or completing a short word, the short word being shorter than the long word and being a constituent part of the long word, the short word and the long word being presented at the same time in the user interface;

enabling selection, through the user interface and with a gesture, to select the short word or the long word through selection of one or more of the multiple character strings, wherein the selection of the multiple character string for the short word would be selecting a portion of the multiple character string for the long word;

receiving selection, through the user interface, of the short word or the long word of the one of the multiple character strings through the gesture; and providing or presenting the selected short word or long word.

2. The system as recited in claim 1, wherein the selected character is received from an application associated with a gesture-sensitive character-entry interface and at a second application, the second application presenting the multiple character strings in the user interface, the user interface partially obscuring the gesture-sensitive character-entry interface.

3. The system as recited in claim 1, wherein the multi-string is determined to be presented based on an amount of display real estate taken up by the multi-string relative to other potential character strings.

4. The system as recited in claim 1, wherein enabling selection through the user interface and with the gesture enables selection through a straight line from a starting point at a key of a gesture-sensitive character-entry interface, the starting point at a tap and ending with the straight line.

5. The system of claim 1, wherein the gesture is a continuous gesture that includes a first portion at which the selected character is selected and a second portion at which the short word or the long word is selected.

6. The system of claim 1, wherein providing or presenting the short word or the long word provides the short word or the long word to an application to which the selected character was intended to be provided by a gesture-sensitive character-entry interface through which the selected character is selected, the providing effective to enable presentation or use of the selected short word or the long word by the application.

7. One or more non-transitory computer-readable storage media having instructions stored thereon that, responsive to execution by one or more processors, causes the one or more processors to perform operations comprising:

receiving an indication indicating selection of a character, the selection of the character through a gesture-sensitive character-entry interface;

presenting or causing presentation of, responsive to the selection of the character, based on the character, and through a completion interface, multiple characters adjacent a location at which the character was selected or superimposed over at least a portion of the gesture-sensitive character-entry interface, at least one of the multiple characters being a multi-string having or completing a long word and a short word, the short word being shorter than the long word and being a constituent part of the long word, the short word and the long word being presented at a same time and in the completion interface;

enabling selection, through the completion interface, to select the short word or the long word, wherein selecting the short word would be selecting a portion of the multiple characters for the long word;

receiving selection, through the completion interface, of the short word or the long word; and providing or presenting the selected short word or long word.

8. The media of claim 7, wherein presenting or causing presentation is responsive to determining that a gesture selecting the character through the gesture-sensitive character-entry interface has not ended or indicates selection of the completion interface.

9. The media of claim 7, wherein providing or presenting is responsive to receiving an indication that a gesture received through the completion interface is complete.

10. The media of claim 7, wherein the indication is received from a first application associated with the gesture-sensitive character-entry interface and at a second application, the second application presenting the multiple characters in the completion interface and providing or presenting the selected one of the multiple characters provides the selected one of the multiple characters to the first application.

11. The media of claim 7, wherein the selected character is a second character of the short word and the long word, the indication indicates selection of the second character, and presenting or causing presentation is responsive to the indication of the selection of the second character.

12. The media of claim 7, wherein the multiple characters are determined based on words of a language, acronyms or text strings of the language, words or acronyms or text strings based on a user history, or lengths of the words of the language.

13. The media of claim 7, wherein the multi-string is determined for presentation based on an aggregate likelihood of selection of the long word and the short word.

14. The media of claim 7, wherein presenting or causing presentation is responsive to determining that a first portion of a gesture selects the character through the gesture-sensitive character-entry interface and wherein the gesture includes a second portion, the second portion received through the completion interface and selecting the short word or the long word.

15. A system comprising:

one or more processors; and memory having one or more instructions stored thereon that, responsive to execution by the one or more processors, causes the one or more processors to perform operations comprising:

presenting a first user interface having, and enabling selection of, multiple characters or character strings through a gesture or gesture portion, the multiple characters or character strings presented at least partially obscuring an unselected character entry control or adjacent to or surrounding a selected character entry control, at least one of the character strings having or completing a long word and a short word, the short word being shorter than the long word and being a constituent part of the long word, the short word and the long word being presented at a same time in the first user interface; and responsive to selection through the first user interface to select the short word or the long word through selection of one or more of the multiple characters or character strings, wherein selecting the multiple characters or character strings for the short word would be selecting a portion of the multiple characters or character strings for the long word, providing the selected short word or long word.

16. The system as recited in claim 15, wherein the multiple characters or character strings are partially opaque effective to enable both the multiple characters or character strings and the unselected character entry control of a second user interface to be visible.

17. The system as recited in claim 15, wherein providing the selected short word or long word causes display of selected short word or long word in the first user interface or a second user interface, the second user interface associated with the selected character entry control.

18. The system of claim 15, wherein the operations further comprise presenting a gesture-sensitive character-entry interface through which the unselected character entry control or the selected character entry control is presented.

19. The system as recited in claim 15, wherein providing the selected short word or long word provides the selected short word or long word to an application to which a prior-selected character selected through the selected character entry control was received or is intended to be received.

20. The system of claim 15, wherein the multiple characters are determined based on words of a language, acronyms or text strings of the language, words or acronyms or text strings based on a user history, or lengths of the words of the language, and also an aggregate likelihood of selection of the long word and the short word.

* * * * *